Sept. 16, 1924.
A. D. GALLAGHER
1,508,930
AGRICULTURAL IMPLEMENT
Filed March 11, 1922    3 Sheets-Sheet 1
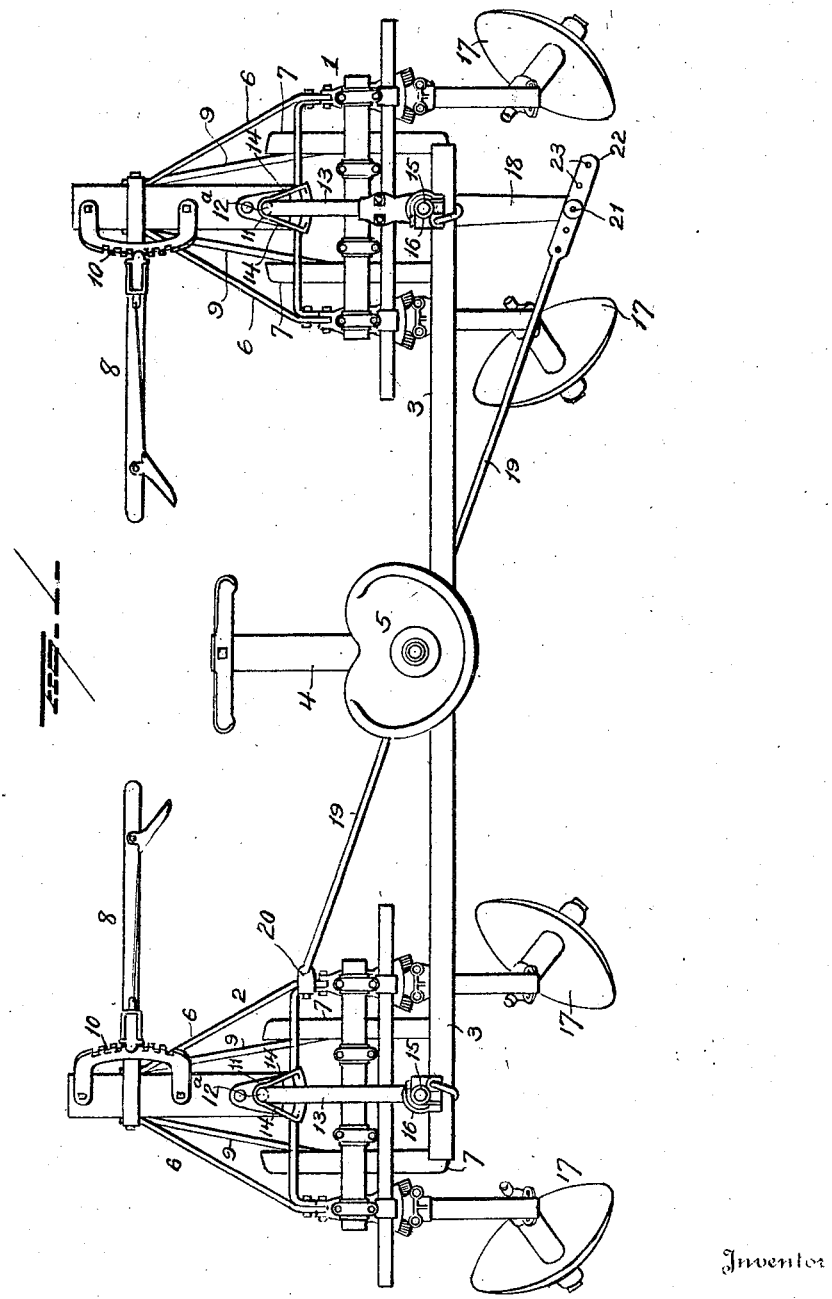

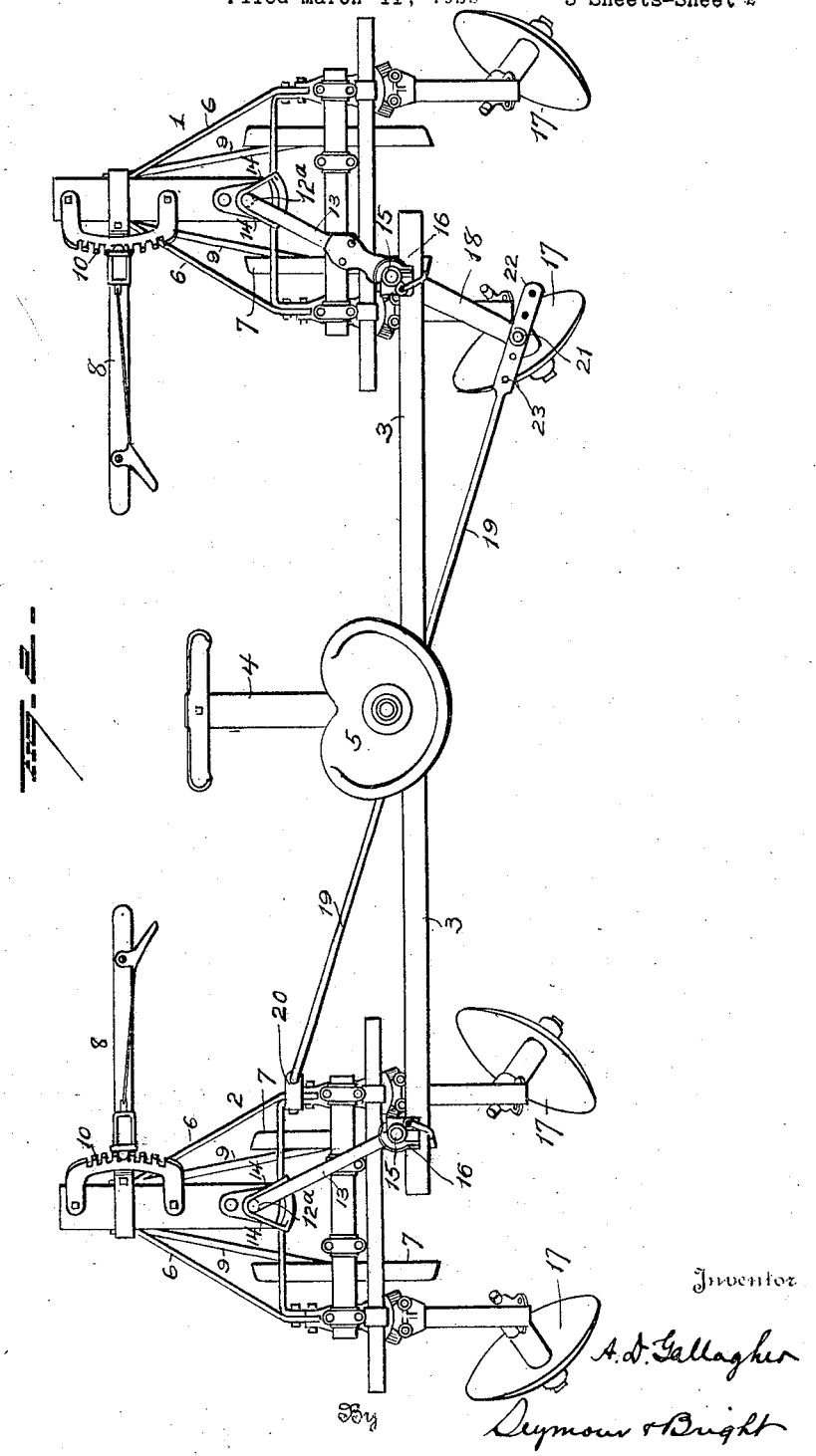

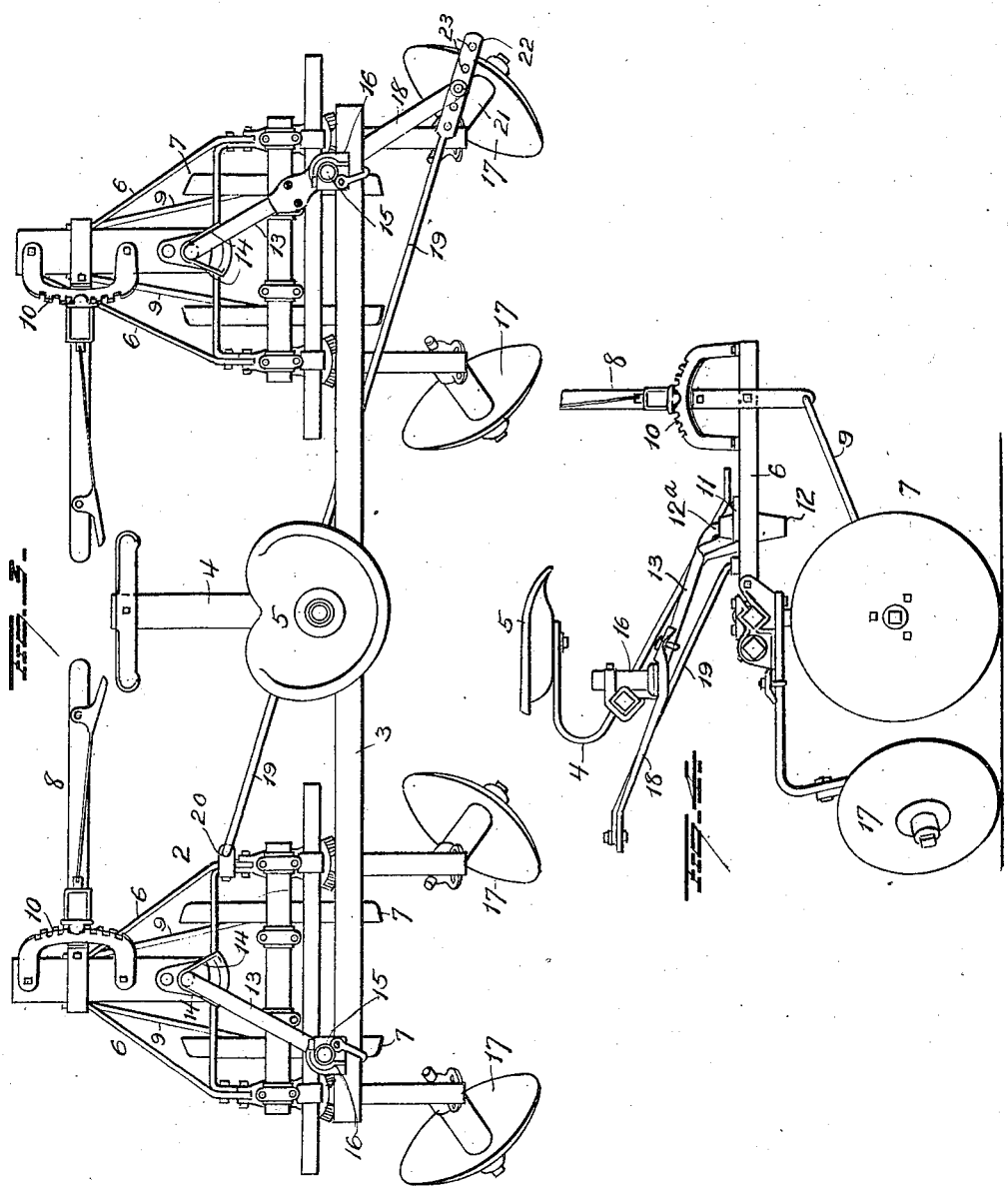

Patented Sept. 16, 1924.

1,508,930

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

AGRICULTURAL IMPLEMENT.

Application filed March 11, 1922. Serial No. 543,050.

*To all whom it may concern:*

Be it known that I, ARTHUR D. GALLAGHER, a citizen of the United States, and a resident of South Bend, in the county of St. Joseph and State of Indiana, have invented certain new and useful Improvements in Agricultural Implements; and I do hereby declare the following to be a full, clear, and exact description of the invention, such as will enable others skilled in the art to which it appertains to make and use the same.

This invention relates to improvements in agricultural implements and more particularly to such as comprise two relatively movable or shiftable implement frames connected by a seat-supporting beam,—one object of the invention being to so provide simple and efficient means in an agricultural implement comprising two implement frames having flexible connection with a seat supporting beam, that the seat carried by said beam shall always be centrally disposed between the two implement frames regardless of the extent of lateral shifting of said frames relatively to each other.

With this and other objects in view, the invention consists in certain novel features of construction and combinations of parts as hereinafter set forth and pointed out in the claims.

In the accompanying drawings; Figure 1 is a plan view of a listed corn cultivator illustrating an embodiment of my invention, the various parts being shown in normal position; Figure 2 is a view, with the respective cultivators at their maximum distance apart; Figure 3 is a plan view showing the cultivators at a minimum distance apart.

The cultivator units are indicated at 1 and 2 and these are connected by a beam 3, to the center of which latter, the spring or support 4 of a seat 5 is rigidly secured.

Each cultivator unit comprises a frame 6 mounted on wheels 7 and provided with an approximately horizontal adjusting lever 8 suitably connected by rods 9 with the wheel mountings, and said lever is provided with a suitable detent to cooperate with a toothed segment 10.

Secured centrally on each implement frame is a bracket 11 having a bearing 12 for a crank 12ª at one end of a lever 13, and said bracket 11 is provided with radiating stop flanges 14 for said lever. The rear end of the lever 13 is provided with a crank 15 mounted in a bracket 16 rigidly secured to the seat beam 3. Each cultivator unit is provided with soil-engaging members which may be in the form of disks 17 suitably connected with the frame.

To the lever 13 of one of the cultivator units, a lever extension 18 is rigidly secured and projects rearwardly therefrom. In the drawings, the lever extension 18 is shown as secured to the lever 13 of the cultivator unit 1 although it will be understood that the extension 18 may be secured to the lever 13 of either of the cultivator units. The lever extension 18 is of such length that it will project rearwardly from the rear pivotal mounting at 15 of the lever 13, a distance equal to that between the front and rear pivotal mountings of the latter. In other words, the members 13 and 18 constitute a lever pivotally supported centrally between its ends, so that the two members 13 and 18 forming such lever will be equal in length.

A rod 19 is pivotally connected at one end to a bracket 20 secured to the inner side of the frame of the cultivator unit 2, at a point approximately midway between the front and rear ends of said unit. From its connection with the cultivator unit 2, the rod 19 extends diagonally to the rear end of the lever member or extension 18 of the cultivator unit 1 and is pivoted to the rear end portion of said lever extension, as indicated at 21,—said rod being provided at this end with a flattened portion 22 having a plurality of holes 23, whereby its connection with the lever extension may be adjusted.

In Figure 1 of the drawings, the cultivator units are shown in their normal positions relatively to the seat. It is evident that the two cultivator units are free to move laterally by reason of their pivotal connections with the seat beam 3 through the medium of the lever members 13, such lateral movement being limited by engagement of said levers with stop flanges 14 on brackets 11. Were means not provided to prevent it, the lateral movements of the two units would not be uniform and one of them might move further than the other, so that the seat 5 would not be disposed centrally between them and might become so disposed that one of the control levers might be out of reach of the operator. This difficulty would be liable to exist when operating on hillsides, when the levers 13 would swing until they engage stop flanges 14. This would throw the weight of the operator laterally and the implement would drift. These difficulties are overcome by the employment of my improvements including the connections 18 and 19 between the lever member 13 of one cultivator unit and the frame of the other cultivator unit.

Since the distance between the pivotal connection of the rod 19 with the lever extension 18 and the pivotal connection of the lever 13 at 15 is equal to the distance between the pivot at 15 and the pivot at 12ª, lateral movement of the cultivator unit 2 would be transmitted through the rod 19 to the lever extension 18, so that the pivotal point at 21 would move a distance equal to the distance the unit 2 had moved laterally, and the cultivator unit 1 would be caused, by the action of the lever 13—18 to move laterally a distance equal to that of the lateral movement of the unit 2 but in the reverse direction, and the seat 5 will be maintained centrally disposed between the two units. Thus it will be seen that the lateral movement of each cultivator unit will always be one-half of the combined movements of the two units relatively to each other.

Should the lateral movement of the cultivator unit 2 be outwardly, the two units would move from the positions shown in Figure 1 toward the positions shown in Figure 2,—the latter illustrating the maximum outward lateral movements of said units. On the other hand, should the unit 2 move inwardly from the position shown in Figure 1, the two units would move toward each other, and the maximum inward movements of the two units is illustrated in Figure 3.

While I have illustrated my improvements as applied to a listed corn cultivator, it will be understood that they are applicable to any implement embodying two agricultural implements connected by a seat beam and movable laterally with respect to each other.

Having fully described my invention what I claim as new and desire to secure by Letters-Patent, is:—

1. The combination with a seat beam, two agricultural units, and lever connections between each agricultural unit and the seat beam, whereby said units are movable relatively to each other and relatively to the seat beam, of a diagonally disposed connecting means pivotally attached at one end to one of the agricultural units and means pivotally attaching said connecting means with the lever connection between the other agricultural unit and the seat beam.

2. The combination with a seat beam, two agricultural units, and lever connections between each agricultural unit and the seat beam, whereby said units are movable relatively to each other and relatively to the seat beam, of a diagonally disposed connecting means pivotally attached at one end to one of the agricultural units and means pivotally and adjustably attaching said connecting means with the lever connection between the other agricultural unit and the seat beam.

3. The combination with two agricultural units, an interposed seat-supporting beam, and levers connecting said units with said beam, of a lever extension projecting from the lever connected with one only of said units, and a single means connecting said lever extension with the frame of the other unit.

4. The combination with two agricultural units, an interposed seat supporting beam, and levers pivotally connected at their end to the units and beam respectively, of a lever extension secured to the lever connected with one only of said units, a rod pivotally connected with the frame of the other unit and pivotally connected with said lever extension at a point approximately the same distance from the pivotal connection of the lever with the beam as the distance between the pivotal connections of said lever with the beam and the other agricultural unit.

In testimony whereof, I have signed this specification in the presence of two subscribing witnesses.

ARTHUR D. GALLAGHER.

Witnesses:
JENNIE M. DAVIS,
EMMA ULLERY.